Sept. 29, 1964         C. C. DEES         3,150,460
FISHING DEVICE
Filed Nov. 8, 1962
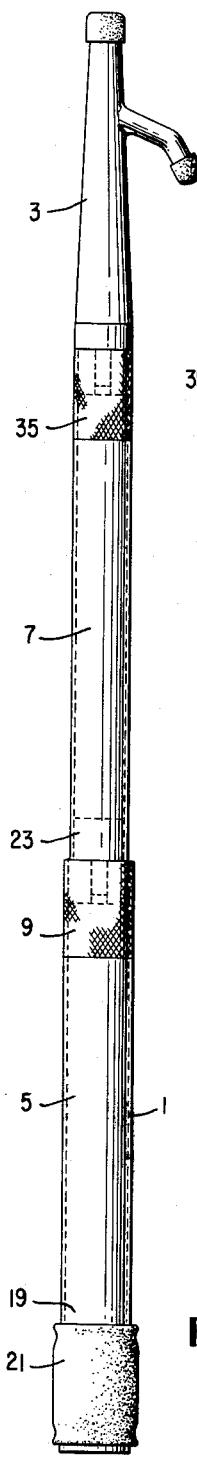
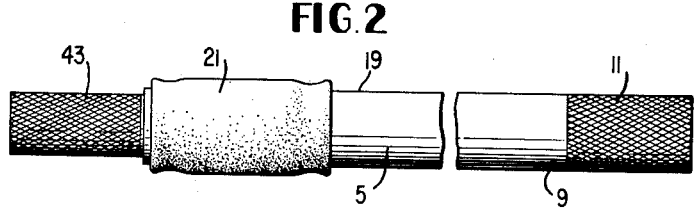
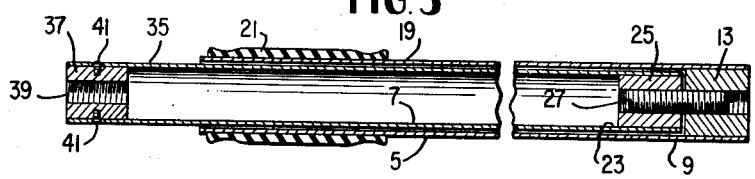
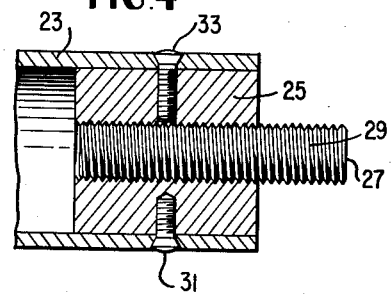
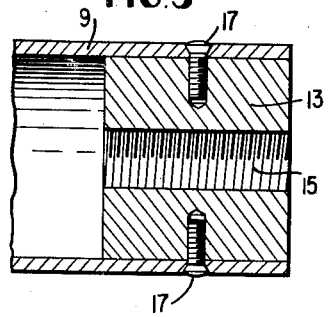
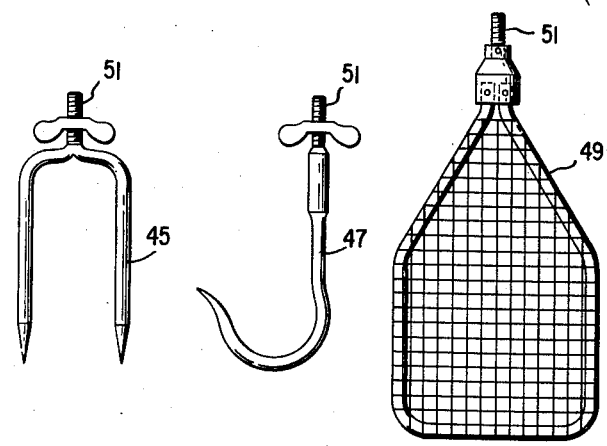
INVENTOR.
CHARLES C. DEES
BY Shanley & O'Neil
ATTORNEYS United States Patent Office 3,150,460
Patented Sept. 29, 1964

3,150,460
FISHING DEVICE
Charles C. Dees, 5021 Winnetka St., Houston 21, Tex.
Filed Nov. 8, 1962, Ser. No. 236,350
7 Claims. (Cl. 43—4)

The present invention relates to a fishing device, more particularly of the type having a telescoping handle for supporting a fishing implement.

It is an object of the present invention to provide a fishing device that can be readily assembled from telescoped relationship or disassembled and telescoped for carrying or storing.

Another object of the present invention is the provision of a fishing device interchangeably providing a support for any of a variety of fishing implements.

Still another object of the present invention is the provision of the fishing implement having a handle that is adjustable selectively to any of several lengths for use.

Finally, it is an object of the present invention to provide a fishing device that is relatively simple and inexpensive to manufacture, easy to assemble, disassemble and operate, and rugged and durable in use.

Other objects and advantages of the present invention will become apparent from a consideration of the following description, taken in connection with the accompanying drawing, in which:

FIGURE 1 is the view of the fishing device of the present invention in its extended operation condition;

FIGURE 2 is a view, with parts broken away, of the exterior of the handle of the present invention in telescoped relationship;

FIGURE 3 is a view similar to FIGURE 2 but showing the structure in cross section;

FIGURE 4 is an enlarged fragmentary cross-sectional view of one end of a handle section of the present invention;

FIGURE 5 is an enlarged fragmentary cross-sectional view of one end of another handle section of the invention; and FIGURE 6 is a view of alternative fishing implements that may be used interchangeably in the fishing device of the present invention.

Referring now to the drawing in greater detail, there is shown a fishing device comprising an elongated telescopic handle 1 carrying a fishing implement 3 at one end thereof. In FIGURE 1, the fishing implement is shown as a boat hook. Handle 1 is comprised of a plurality of handle sections, and in the illustrated embodiment the handle sections are shown as a first handle section 5 and a second handle section 7 in end-to-end detachable relationship with each other and with fishing implement 3.

With more particular reference to first handle section 5, that handle section is provided at one end 9 thereof with knurling 11 on its outer surface which comprises an antifriction surface for gripping and twisting handle section 5. Handle section 5 is hollow and of tubular metal stock and is provided at end 9 with an internal annular sleeve 13 that has a bore or opening extending fully therethrough axially of first handle section 5 and that is provided on its internal surface with screw threads 15. Screws 17 extend through end 9 of first handle of section 5 and removably fixedly secure sleeve 13 in end 9 flush with the end of end 9. At its other end 19, first handle section 5 is open and is provided on the outside of the tubular stock with an antifriction hand grip 21 which may be of rubber, cork or other material having high coefficient of friction in contact with the hand of the user.

With more particular reference now to second handle section 7, this section is also hollow and of tubular metal stock and is provided at one end 23 with an internal annular sleeve 25 having an opening extending fully therethrough axially of second handle section 7 and internally screw-threaded. An externally screw-threaded stud 27 is disposed in the complementary screw threads of sleeve 25 and extends endwise beyond sleeve 25 and end 23, the outer ends of which are flush with each other. The external screw threads 29 of stud 27 are complementary not only to the internal screw threads of sleeve 25 but also to the internal screw threads 15 of sleeve 13. The internal bores of sleeves 13 and 25 are of the same diameter and their screw threads are also the same to the extent necessary to enable them both to receive the same screws, so that the single stud 27 can extend between and releasably interconnect sleeves 13 and 25. Sleeve 25 is secured in end 23 of second handle section 7 by means of screw 31 and set screw 33. Set screw 33 performs the additional function of securing stud 27 in sleeve 25.

At its other end 35, second handle section 7 is provided with a sleeve 37 which may be identical to sleeve 25 and in any event has the same size bore extending full length therethrough in axial alignment with sleeve 25, and has internal screw threads 39 the same as those on sleeves 13 and 25 to the extent that the same screw can be received in all three sets of screw threads. Screws 41 releasably retain sleeve 37 in end 35 of second handle section 7 with the outermost ends of sleeve 37 and end 35 flush with each other. End 35 of second handle section 7 is provided with external knurling 43 or is otherwise provided with a high friction grip to facilitate twisting second section 7.

In use, the device is assembled as shown in FIGURE 1, with handle sections 5 and 7 in end-to-end relationship and stud 27 screwed into the outer end of sleeve 13 so that ends 9 and 23 of first and second handle sections 5 and 7, respectively, are adjacent each other and in axial alignment with each other. The other end 35 of second handle section 7 is at the outermost end of the handle and releasably supports a fishing implement 3 which is screwed into sleeve 37. FIGURE 6 shows that any of a variety of fishing implements other than the boat hook shown in FIGURE 1 may be used. Thus, a gig 45 may be selected, or a gaff 47 or a landing net 49. In any event, each of the fishing implements 3 is provided with an externally screw-threaded stud 51 and the external screw threads of which are similar to those of studs 27 to the extent that they will mate with any screw threads that stud 27 will mate with, and specifically either screw threads 39 or screw threads 15.

First handle section 5 has an internal diameter sufficiently great to receive second handle 7 in telescoping relationship therein in the position shown in FIGURES 2 and 3. To achieve that position, stud 27 is unscrewed from the outer end of sleeve 13 and second handle section 7 is turned end for end and inserted stud first into first handle section in telescoped relationship. Stud 27 then enters and is screwed into the other or inner end of sleeve 13, and the engagement of the outer end of sleeve 25 with the inner end of sleeve 13 provides a natural stop that limits this telescoping movement and that assures that handle sections 5 and 7 will be in a firmly telescoped assembly for carrying or storage.

It is also to be noted that in this telescoped relationship, a fishing implement 3 may be screwed directly into sleeve 13, so that a shorter handle 1 is provided and at the same time second handle section 7 is firmly stored in the position that does not interfere with the use of such a shorter handled fishing device. The uses for such a shorter handled device are manifold, including working with heavier fish or working from boats that are lower in the water or have lower gunwales.

While it will be noted that sleeve 13 is open from endto-end thereof, it should be borne in mind that it is also possible to have sleeve 13 open only at its ends, as would be the case if sleeve 13 were drilled from both ends but not clear through. The embodiment of sleeve 13 shown is preferred because it permits maximum telescoping of the parts and is easier to fabricate.

Sleeves 25 and 37 may be different from each other, but it is preferred that they be identical for interchangeability and ease of assembly and repair.

It should also be noted that end 35 in the telescoped relationship of FIGURES 2 and 3 projects endwise beyond end 19 of first handle section 5 a substantial distance, which permits the knurling 43 or other antifriction grip on end 35 of handle section 7 to be used to insert and withdraw handle section 7 from telescoped relationship. At the same time, the antifriction surface provided by knurling 43 also provides a convenient hand grip for assembling handle 1 in the position shown in FIGURE 1, and also for twisting the handle when fishing implements 3 are to be mounted or dismounted from end 35.

From a consideration of the foregoing disclosure, therefore, it will be obvious that all of the initially recited objects of this invention have been achieved.

Although the present invention has been described and illustrated in connection with preferred embodiments, it is to be understood that modifications and variations may be resorted to without departing from the spirit of the invention, as those skilled in this art will readily understand. For example, more than two handle sections can be provided, although means other than those shown would have to be provided for storing a third or further handle section. These and other modifications and variations are considered to be within the purview and scope of the present invention as defined by the appended claims.

What is claimed is:

1. A fishing device comprising a handle in at least two sections, the first handle section being hollow and having an internal diameter sufficiently great to receive the second handle section in telescoped relation therein, a sleeve open at both ends disposed in one end of the first handle section, the opening at each end of the sleeve being substantially smaller in diameter than the internal diameter of said one end of the first handle section, a member projecting from one end of the second handle section and being of a size to fit in either end of the sleeve and of a diameter substantially smaller than the diameter of said one end of the second handle section, and means engaging between said sleeve and said member releasably to retain said member in said sleeve both when the handle sections are assembled in end-to-end relation and when the handle sections are telescoped with said second handle section disposed within said first handle section.

2. A fishing device as claimed in claim 1, and a fishing implement on the other end of said second handle section.

3. A fishing device as claimed in claim 1, said means comprising complementary screw threads on the sleeve and on said member.

4. A fishing device as claimed in claim 1, said sleeve having an internal opening extending lengthwise of the sleeve entirely through the sleeve.

5. A fishing device comprising a handle in at least two sections, the first handle section being hollow and having an internal diameter sufficiently great to receive the second handle section in telescoped relation therein, a sleeve open at both ends disposed in one end of the first handle section, a member projecting from one end of the second handle section and being of a size to fit in either end of the sleeve, means engaging between said sleeve and said member releasably to retain said member in said sleeve both when the handle sections are assembled in end-to-end relation and when the handle sections are telescoped with said second handle section disposed within said first handle section, and means on the other end of said second handle section for releasably mounting a fishing implement, the mounting means comprising a second sleeve having the same size internal configuration as the first-named sleeve so that a fishing implement can be selectively mounted in either sleeve.

6. A fishing device comprising a handle in at least two sections, the first handle section being hollow and having an internal diameter sufficiently great to receive the second handle section in telescoped relation therein, a sleeve open at both ends disposed in one end of the first handle section, a member projecting from one end of the second handle section and being of a size to fit in either end of the sleeve, and means engaging between said sleeve and said member releasably to retain said member in said sleeve both when the handle sections are assembled in end-to-end relation and when the handle sections are telescoped with said second handle section disposed within said first handle section, the second handle section having a length such that the other end of said second handle section protrudes a substantial distance from the other end of said first handle section in the telescoped position of the handle sections.

7. A fishing device as described in claim 6, the other end of said second handle section having a friction grip surface thereon.

References Cited in the file of this patent

UNITED STATES PATENTS

| | | |
|---|---|---|
| 169,485 | Saxton | Nov. 2, 1875 |
| 696,705 | Allen | Apr. 1, 1902 |
| 849,481 | Lobit | Apr. 9, 1907 |
| 2,482,157 | Crot | Sept. 20, 1949 |
| 2,566,647 | Wissman | Sept. 4, 1951 |
| 3,004,362 | Day | Oct. 17, 1961 |